(12) United States Patent
McEachern et al.

(10) Patent No.: US 11,500,983 B2
(45) Date of Patent: Nov. 15, 2022

(54) CONFIGURABLE SYSTEM FOR DETECTING SOCIAL MEDIA THREATS

(71) Applicant: ZeroFOX, Inc., Baltimore, MD (US)

(72) Inventors: Kavan B. McEachern, Baltimore, MD (US); Robert K. Jackson, Jr., Jefferson, MD (US); Christopher J. Raborg, Abingdon, MD (US); Ryan J. Morton, Phoenix, MD (US)

(73) Assignee: ZeroFOX, Inc., Baltimore, MD (US)

( * ) Notice: Subject to any disclaimer, the term of this patent is extended or adjusted under 35 U.S.C. 154(b) by 360 days.

(21) Appl. No.: 16/876,772

(22) Filed: May 18, 2020

(65) Prior Publication Data
US 2021/0357498 A1 Nov. 18, 2021

(51) Int. Cl.
*G08B 23/00* (2006.01)
*G06F 21/55* (2013.01)
*G06F 16/953* (2019.01)
*G06N 7/00* (2006.01)

(52) U.S. Cl.
CPC .......... *G06F 21/552* (2013.01); *G06F 16/953* (2019.01); *G06N 7/005* (2013.01); *G06F 2221/034* (2013.01)

(58) Field of Classification Search
CPC .... G06F 16/953; G06F 21/552; G06F 21/316; G06F 21/55; G06F 21/62; G06F 21/6218; G06F 21/6227; G06F 21/6263; G06F 21/645; G06N 7/005; H04L 63/0263; H04L 63/101
USPC .......................................................... 726/23
See application file for complete search history.

(56) References Cited

U.S. PATENT DOCUMENTS

| | | | | |
|---|---|---|---|---|
| 10,452,466 | B1* | 10/2019 | Mitchell | G06F 11/301 |
| 2009/0125469 | A1* | 5/2009 | Mcdonald | G06N 5/025 |
| | | | | 706/47 |
| 2013/0110922 | A1* | 5/2013 | Shih | G06Q 50/01 |
| | | | | 709/204 |
| 2014/0052776 | A1* | 2/2014 | Lafon | G06Q 50/01 |
| | | | | 709/203 |

(Continued)

OTHER PUBLICATIONS

Robertson et al, A Social Approach to Security: Using Social Networks to Help Detect Malicious Web Content, IEEE, Nov. 16, 2010, pp. 436-441. (Year: 2010).*

(Continued)

*Primary Examiner* — Luu T Pham
*Assistant Examiner* — Jenise E Jackson
(74) *Attorney, Agent, or Firm* — DLA Piper LLP (US)

(57) ABSTRACT

A system may include: a server comprising a rule cache; a user device communicably coupled to the server; a computer-readable medium comprising instructions that cause the server to: monitor a plurality of third-party data sources; obtain, via a queueing service, a plurality of pieces of content from the plurality of third-party data sources; for each piece of content, fetch a rule ID from a list of rule IDs on the user device, wherein the rule ID is fetched based on the content and a pre-selected setting on the user device; use the rule ID to fetch a rule from the rule cache, the rule comprising a script, the script comprising executable code; execute the script on the piece of content to determine if the piece of content matches the rule; and in response to determining that the piece of content matches the rule, send an alert to the user device.

16 Claims, 12 Drawing Sheets

(56) References Cited

U.S. PATENT DOCUMENTS

| | | | |
|---|---|---|---|
| 2015/0032675 A1* | 1/2015 | Huehn | G06Q 50/01 |
| | | | 707/740 |
| 2015/0127754 A1* | 5/2015 | Clark | H04L 51/10 |
| | | | 709/206 |
| 2018/0115569 A1* | 4/2018 | Anders, Jr. | H04L 63/1441 |
| 2019/0073734 A1* | 3/2019 | Reischer | G06Q 50/01 |
| 2019/0286540 A1* | 9/2019 | Bates | G06K 9/6267 |
| 2021/0174223 A1* | 6/2021 | Dodwell | G06Q 30/0277 |

OTHER PUBLICATIONS

Sarker et al, Automatic Individual Information Aggregation Using Publicly Available Social Media Data, IEEE, Dec. 20, 2019, pp. 1-6. (Year: 2019).*

Al-Qurishi et al, Leveraging Analysis of User Behavior to Identify Malicious Actitivies in Large-Scale Social Networks, IEEE, Sep. 18, 2017, pp. 799-813. (Year: 2017).*

* cited by examiner

CONFIGURABLE SYSTEM FOR DETECTING SOCIAL MEDIA THREATS

BACKGROUND

As threats continue to grow on social media and other digital platforms, such as mobile apps and the dark web, security teams representing organizations or companies face the need to monitor and detect these threats. Oftentimes the safeguard of an organization, brand, people, and even locations can depend on quickly and reliably detecting digital and social media threats online.

Organizations attempting to detect online threats can face a plethora of issues including how to deal with the massive volumes of ingested data, how to determine what actually constitutes a risk, and how to effectively deal with the diversity of risks out there. Risks can range from the impersonation of social media accounts to violent threats, scams, offensive content, publication of PII (personally identifiable information), and compliance violations. However, different organizations rarely have the same definition of what constitutes a "threat." For example, a large bank may determine that identifying the publication of PII may be of utmost importance but may not deem offensive content on social media to be critically harmful.

SUMMARY OF THE INVENTION

According to one aspect of the present disclosure, a system for rule-based online threat detection can include: a server comprising a rule cache; a user device communicably coupled to the server; and a computer-readable medium comprising instructions stored thereon. The instructions, when executed by the serve, cause the server to execute a process operable to: monitor a plurality of third-party data sources; obtain, via a queueing service, a plurality of pieces of content from the plurality of third-party data sources; and, for each piece of content: fetch a rule ID from a list of rule IDs on the user device; use the rule ID to fetch a rule from the rule cache; execute the script on the obtained piece of content to determine if the piece of content matches the rule; and in response to determining that the piece of content matches the rule, send an alert to the user device. The rule ID can be fetched based on the piece of content and a pre-selected setting on the user device. The rule can include a script, wherein the script can include executable code.

In some embodiments, the server can be configured to, in response to receiving an error while executing the script, store the error in a sorted set in the rule cache. In some embodiments, the server can be configured to, in response to storing the error in the sorted set in the rule cache, trim the sorted set to ten most recent errors. In some embodiments, the server can be configured to, in response to executing the script, store a total number of executions of the script, a total number of execution errors for the script, and a total number of alerts generated for the rule in the rule cache.

In some embodiments, the server can be configured to: fetch, from the rule cache, hourly error data for the rule; calculate an error rate for the rule based on the hourly error data; and in response to calculating an error rate above a certain pre-defined threshold, disallow the server from fetching the rule from the rule cache for a pre-defined amount of time. The hourly error data can include a number of script executions for the rule in a current hour, a number of script executions for the rule in a most recent previous hour, a number of execution errors for the rule in the current hour, and a number of execution errors for the rule in the most recent previous hour.

In some embodiments, the server can include a plurality of server instances and each server can be configured to run a number of executions and can include a local rule cache. In some embodiments, monitoring the plurality of third-party data sources can include: receiving, from the user device, a selection of third-party data sources; and obtaining, via the queueing service, the plurality of pieces of content from the selection of third-party data sources. The selection can be performed via a user input on the user device.

In some embodiments, the server can be configured to: receive, from the user device, a user input from a user associated with a protected entity; configure the script based on the user input to create a parameterized rule; prevent the parameterized rule from being used by entities other than the protected entity; execute the configured script on a second obtained piece of content to determine if the second obtained piece of content matches the parameterized rule; and, in response to determining that the second obtained piece of content matches the parameterized rule, send a second alert to the user device. In some embodiments, the user input can include at least one of: a list of words to include in term-searching the second obtained piece of content; a list of words to exclude from term-searching the second obtained piece of content; or a numerical threshold for tuning a confidence level of the rule that triggers the alert to be generated.

According to another aspect of the present disclosure, a method for rule-based online threat detection can include: monitoring, by a server, a plurality of third-party data sources; obtaining, by the server and via a queueing service, a plurality of pieces of content from the plurality of third-party data sources; and, for each piece of content: fetching, by the server, a rule ID from a list of rule IDs on a user device; using, by the server, the rule ID to fetch a rule from a rule cache, executing, by the server, the script on the obtained piece of content to determine if the piece of content matches the rule; and in response to determining that the piece of content matches the rule, sending an alert to the user device. The rule ID can be fetched based on a third-party data source of the piece of content and a pre-selected setting on the user device. The rule can include a script and the script can include executable code.

In some embodiments, the method can include, in response to receiving an error while executing the script, storing the error in a sorted set in the rule cache. In some embodiments, the method can include, in response to storing the error in the sorted set in the rule cache, trimming the sorted set to ten most recent errors. In some embodiments, the method can include, in response to executing the script, storing, by the server, a total number of executions of the script, a total number of execution errors for the script, and a total number of alerts generated for the rule in the rule cache.

In some embodiments, the method can include fetching, by the server and from the rule cache, hourly error data for the rule; calculating, by the server, an error rate for the rule based on the hourly error data; and in response to calculating an error rate above a certain pre-defined threshold, disallowing the server from fetching the rule from the rule cache for a pre-defined amount of time. The hourly error data can include a number of script executions for the rule in a current hour, a number of script executions for the rule in a most recent previous hour, a number of execution errors for the rule in the current hour, and a number of execution errors for the rule in the most recent previous hour.

In some embodiments, sending the alert can include: executing, by the server, a plurality of rules on the piece of content to determine if the content matches each rule individually; analyzing the execution of the plurality of rules, in response to analyzing the execution of the plurality of rules, sending the alert to the user device. The analyzing can include using at least one of a Bayes network, a Monte Carlo method, or a custom grouping provided by the user device. In some embodiments, monitoring the plurality of third-party data sources can include receiving, by the server and from the user device, a selection of third-party data sources; and obtaining, by the server and via the queueing service, the plurality of pieces of content from the selection of third-party data sources. The selection can be performed via a user input on the user device.

In some embodiments, the method can include: receiving, by the server and from the user device, a user input from a user associated with a protected entity; configuring, by the server, the script based on the user input to create a parameterized rule; preventing, by the server, the parameterized rule from being used by entities other than the protected entity; executing, by the server, the configured script on a second obtained piece of content to determine if the second obtained piece of content matches the parameterized rule; and in response to determining that the second obtained piece of content matches the parameterized rule, sending a second alert to the user device. In some embodiments, the user input can include at least one of a list of words to include in term-searching the second obtained piece of content; or a list of words to exclude from term-searching the second obtained piece of content. In some embodiments, the user input can include a numerical threshold for tuning a confidence level of the rule that triggers the alert to be generated.

According to another aspect of the present disclosure, a method for rule-based online threat detection can include: monitoring, by at least one of a plurality of server instances, a plurality of third-party data sources; obtaining, by the at least one of a plurality of server instances and via a queueing service, a plurality of pieces of content from the plurality of third-party data sources; and for each piece of content: fetching, by the at least one of a plurality of server instances, a rule ID from a list of rule IDs on a user device; using, by the at least one of a plurality of server instances, the rule ID to fetch a rule from a rule cache; executing, by the at least one of a plurality of server instances, the script on the obtained piece of content to determine if the obtained piece of content matches the rule; and in response to receiving an error while executing the script, storing the error in the rule cache. The rule ID can be fetched based on the piece of content and a pre-selected setting on the user device. The rule can include a script. The script can include executable code. The rule cache can be a Redis cluster. The errors associated with a same rule can be stored in a single shard of the Redis cluster.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION OF SEVERAL EMBODIMENTS

Figure 1:
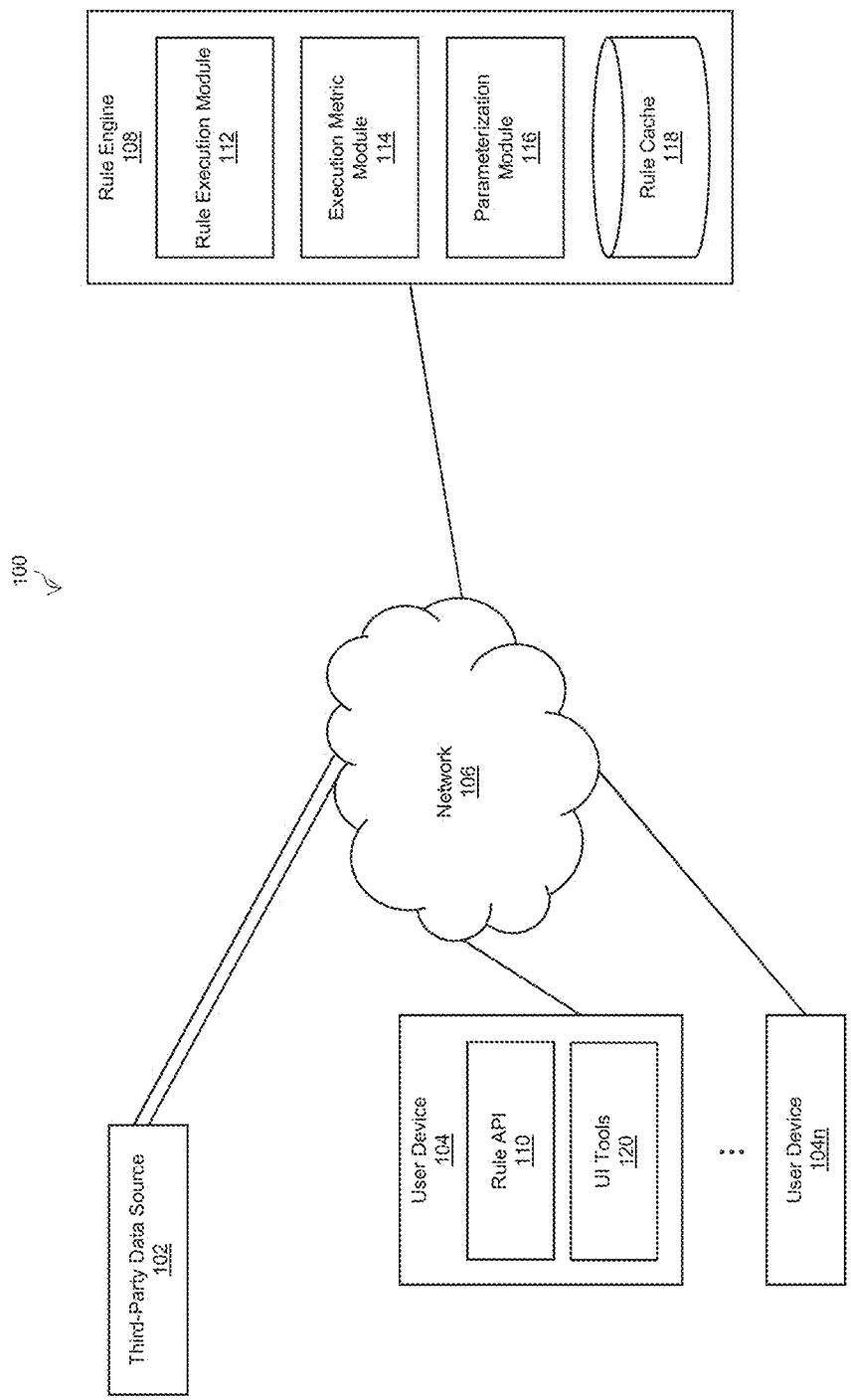
FIG. 1 is a diagram of an illustrative system for the rule-based detection of social media threats, according to some embodiments of the present disclosure.

The following detailed description is merely exemplary in nature and is not intended to limit the invention or the applications of its use.

Embodiments of the present disclosure relate to systems and methods for the rule-based detection of threats and violations on social media and third-party platforms such as SaaS (software as a service) and cloud-based platforms. When an entity wishes to monitor and analyze social media networks or third-party platforms to detect specific content, the entity may use a system that includes a rule engine, according to an embodiment of the present disclosure. The rule engine may utilize rules to detect content that "matches" the rule. An entity may be an organization, location, product, brand, and/or person. Note, in some cases, an entity may not itself be a protected entity and an entity may include a variety of protected entities. For example, a company may be an entity and the company's various brands may be protected entities. Users, as described herein, can include people authorized to make configurations and such on behalf of an entity. The rule engine of the present disclosure may receive content (content may refer to social media data such as tweets, posts, messages, photos, etc., as well as any other type of data collected from a third-party source or platform including links, domains, blog posts, images, files, apps, etc.) from upstream data collectors, execute rules against the content and alert devices associated with the user and/or entity based on content that matches rules. A message (different than a social media message) herein may refer to a unit of data transfer. The data collectors may collect content from a plurality of social media networks including, but not limited to, Facebook, Twitter, Instagram, LinkedIn, YouTube, Slack, and Pinterest. Networks may also include email networks or domains, app stores, online marketplaces, blogs, forums, traditional computing network search engines (e.g. CIDR block searching, IP's, open ports, etc.), and/or the dark web. A network ingest service may constantly monitor and/or ingest content from pre-specified data sources and continuously supply them to the rule engine to be analyzed at a relatively constant rate (e.g. to queue the content via a queueing service). A rule may be a JavaScript function (or any alternative scripting language); the script may be executed on a piece of content, returning a result or prediction. "Matching" the rule depends on the result of this execution. For example, an entity may want to detect weapons, for example, guns on social media and may implement a rule that includes an object detection algorithm (or the results thereof) trained to analyze posts for guns. The rule engine may receive a large amount of posts from third-party data sources, execute the script contained in the rule on each post, and, if an execution of the rule corresponds to a result indicative of a gun, then an alert may be sent to a device associated with the entity.

Other examples of rules may include sentiment analysis of text, money flipping scam analysis, email abuse, malicious link detection, detection of bank account numbers, business email compromise, object detection for objects other than guns (credit cards, knives, etc.), counterfeit goods on marketplaces, phishing domains, fraudulent job postings, risky mobile apps, cyberattacks, PII violations, compliance violations (e.g. HIPAA, GDPR, etc.), language detection, and specific word or phrase mentions. The system typically may have a large base of pre-defined rules that are usable by all entities that utilize the system. The system may also employ functionality to allow entities (more specifically, to allow users representing those entities) to dynamically configure pre-defined rules on a per customer/entity basis. The configuration may be performed without the need to code; user interface functionality may receive user input through an API and use the input to modify the behavior of a rule or change the parameters of a rule. In some embodiments, the configuration may be passed through to the JavaScript via function parameters, which can cause the JavaScript to dynamically react based on those parameters. In some embodiments, rule configuration can control actions to be performed after alerting has occurred. For example, a configuration can dictate how to notify a user of an alert or whether to perform an automated remediation action such as taking the source content down. In some embodiments, a user on behalf of an entity may "subscribe" for use of the system of the present disclosure or utilize the system and service as a subscription.

One of the main issues in maintaining a system such as the one in the present disclosure is dealing with the massive amount of content ingested. As the rule engine may analyze each piece of content ingested from third-party data sources with multiple rules (sometimes up to many hundreds), this requires a significant amount of computation. During times of peak traffic, a rule engine may analyze roughly one million pieces of content per hour. At hundreds of rules per message, a massive amount of computation is required. To minimize computation and input/output operations, and to maximize throughput of the rule engine, the system may employ elements to maximize efficiency, such as a rule cache that stores scripts associated with rules, which may be indexed by a rule ID, methods that allow users to filter and select which rules to execute on each piece of content, and methods for tracking execution metrics.

FIG. 1 is a diagram of an illustrative system 100 for the rule-based detection of social media threats, according to some embodiments of the present disclosure. System 100 may include a rule engine 108 communicably coupled to a plurality of user devices 104 via network 106. The single lines connected user devices 104 and rule engine 108 via network 106 represent standard network connections. Network 106 may also be connected to a plurality of third-party data sources 102. Third-party data sources 102 may include any number of social media networks including Twitter, Facebook, or any previously mentioned networks. The double lines linking network 106 with the third-party data source 102 may comprise an ingest service. In some embodiments, the ingest services can couple incoming or ingested content with customer information.

A user device 104 can include one or more computing devices capable of receiving user input as well as transmitting and/or receiving data via network 106 or communicating with rule engine 108. In some embodiments, user device 104 can include a conventional computer system, such as a desktop or laptop computer. Alternatively, user device 104 may include a device having computer functionality, such as a personal digital assistant (PDA), a mobile telephone, a smartphone, or other suitable device. Each user device 104 may include a rule API 110 and UI tools 120 for allowing a user to interact with the system 100 and the rule engine 108. UI tools 120 may be configured to receive inputs from users (e.g. via a touchscreen or clickable button or user interface) and rule API 110 may communicate these inputs to the rule engine 108 via network 106. In some embodiments, rule engine 108 may include a plurality of server instances.

Network 106 may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 106 can also use standard communication technologies and/or protocols.

In some embodiments, rule engine 108 may include any combination of one or more of web servers, mainframe computers, general-purpose computers, virtual servers, personal computers, or other types of computing devices. Rule engine 108 may represent distributed servers that are remotely located and communicate over a communications network, or over a dedicated network such as a local area network (LAN). Rule engine 108 may also include one or more back-end servers for carrying out one or more aspects of the present disclosure. In some embodiments, rule engine 108 may be the same as or similar to server device 1200 described below in the context of FIG. 12. In some embodiments, rule engine 108 may operate similar to or the same as the server setup 200 in FIG. 2.

Rule engine 108 may include a rule execution module 112, an execution metric module 114, a parameterization module 116, and a rule cache 118. Rule engine 108 may be configured to monitor third-party data sources 102 via network 106 and ingest content and/or posts. Rule engine 108 may also be configured to trigger alerts to be sent to one or multiple of user devices 104. Rule execution module 112 may be configured obtain a list of rule IDs based upon configurations set by a user in the rule API 110. In some embodiments, configurations set by a user in rule API 110 may be stored in a cloud-based platform (not shown). In some embodiments, this list of rule IDs may be activated or selected by a user via rule API 110. Rule execution module 112 may be configured to, once receiving a rule ID, use the rule ID to fetch a script from rule cache 118 based on the rule ID. Rule execution module 112 may also be configured to execute scripts (JavaScript or any other standard scripting language) on posts or content received from third-party data sources 102. Rule execution module 112 may also be configured to execute scripts from parameterized rules (i.e. parameterized scripts). In some embodiments, rule execution module 112 may employ NodeJS to execute processes. Rule execution module 112 may be configured to determine whether content "matches" a rule based on the result of executing the script on the content.

Rule cache 118 may be configured to store scripts for rules. In some embodiments, the scripts may be indexed according to a rule ID or rule identifier. In some embodiments, rule cache 118 may be a Redis cache or a Redis cluster, where a Redis cluster can include one or more shards. Rule cache 118 may be searchable by a user via UI tools 120 on user device 104. Rule cache 118 may also be configured to store errors, error metrics, and execution metrics for each rule. In some embodiments, multiple caches may be employed to store data. For example, one cache can be used to store error data and error metrics and another cache can be used to store execution metrics. In some embodiments, one cache can be used to store error/execution metrics and another cache can be used to stored rules. Metrics stored in rule cache 118 may include, but is not limited to, total numbers of executions of each rule, total numbers of execution errors for each rule, total number of alerts generated for each rule (e.g. how often a rule is broken), and hourly versions of these metrics. Execution metric module 114 may be configured to calculate error rates for each rule stored in the rule cache. Execution metric module 114 may fetch execution and error data from rule cache 118, perform mathematical computation on the data, and calculate an error rate based on the data for each rule. In the case that an error rate is calculated above a certain threshold, execution metric module 114 may send an indicator to rule cache to "blacklist" the rule. A blacklisted rule may be prevented from execution for a certain amount of time. Parameterization module 116 may be configured to receive user inputs from rule API 110 on a user device 104 and configure scripts within rule cache 118 based on the input. Parameterization module 116 may enable data to be passed into the script that can influence or modify its behavior. This may be referred to as a parameterized rule; parameterization module 116 can send parameterized rules to rule cache 118 for storage. In some embodiments, a parameterized rule may be restricted for use by users associated with the entity for which it was created. For example, a licensed officer that works for Company A (Company A is the entity AND the protected entity and the officer is the user) may parameterize a rule. The parameterized rule may then be restricted for use by users associated with Company A. In some embodiments, Company A may want to protect various entities, such as various brands associated with Company A. A parameterized rule created by the licensed officer may then be restricted for use by the entity, but not be restricted by the protected entity.

The various system components—such as modules 112-118—may be implemented using hardware and/or software configured to perform and execute the processes, steps, or other functionality described in conjunction therewith.

Figure 2:
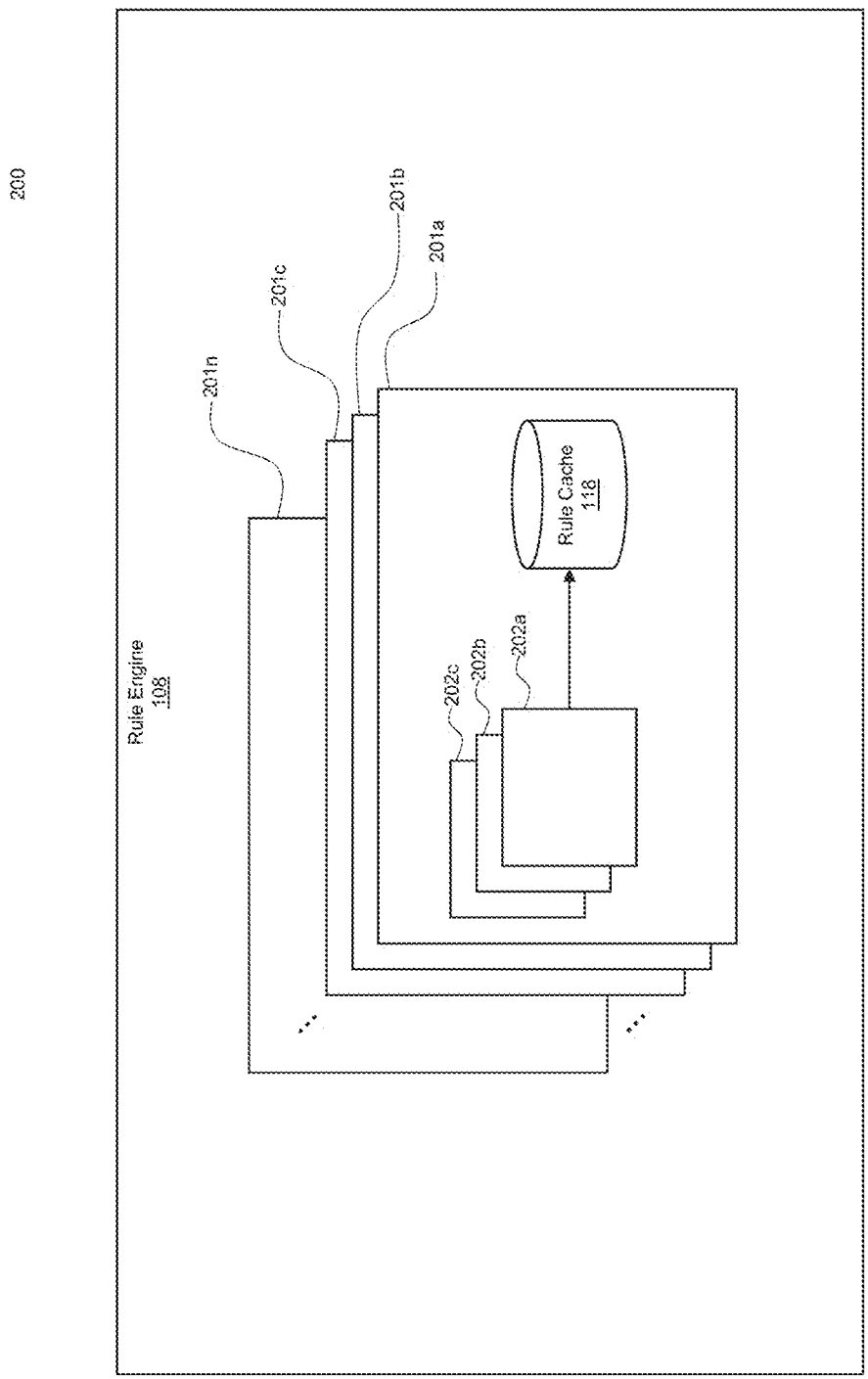
FIG. 2 is a diagram of an illustrative server setup, according to some embodiments of the present disclosure.

FIG. 2 is a diagram of an illustrative server setup 200, according to some embodiments of the present disclosure. Server setup 200 may be an implementation of rule engine 108. In some embodiments, server setup 200 may be implemented on Amazon Web Services (AWS). Rule engine 108 may include a plurality of EC2 (Amazon Elastic Compute Cloud) instances 201a-n (201 generally). EC2 instances 201 may also be other types of virtual machines. Each instance 201 may include a plurality of node processes 202a-c (202 generally) and a local rule cache 118. In some embodiments, a node process may be a NodeJS process; nodes 202 may be configured to execute scripts. Nodes 202 may also be communicably coupled to rule cache 118 for the sharing of execution and error metrics and scripts to execute.

Figure 3:
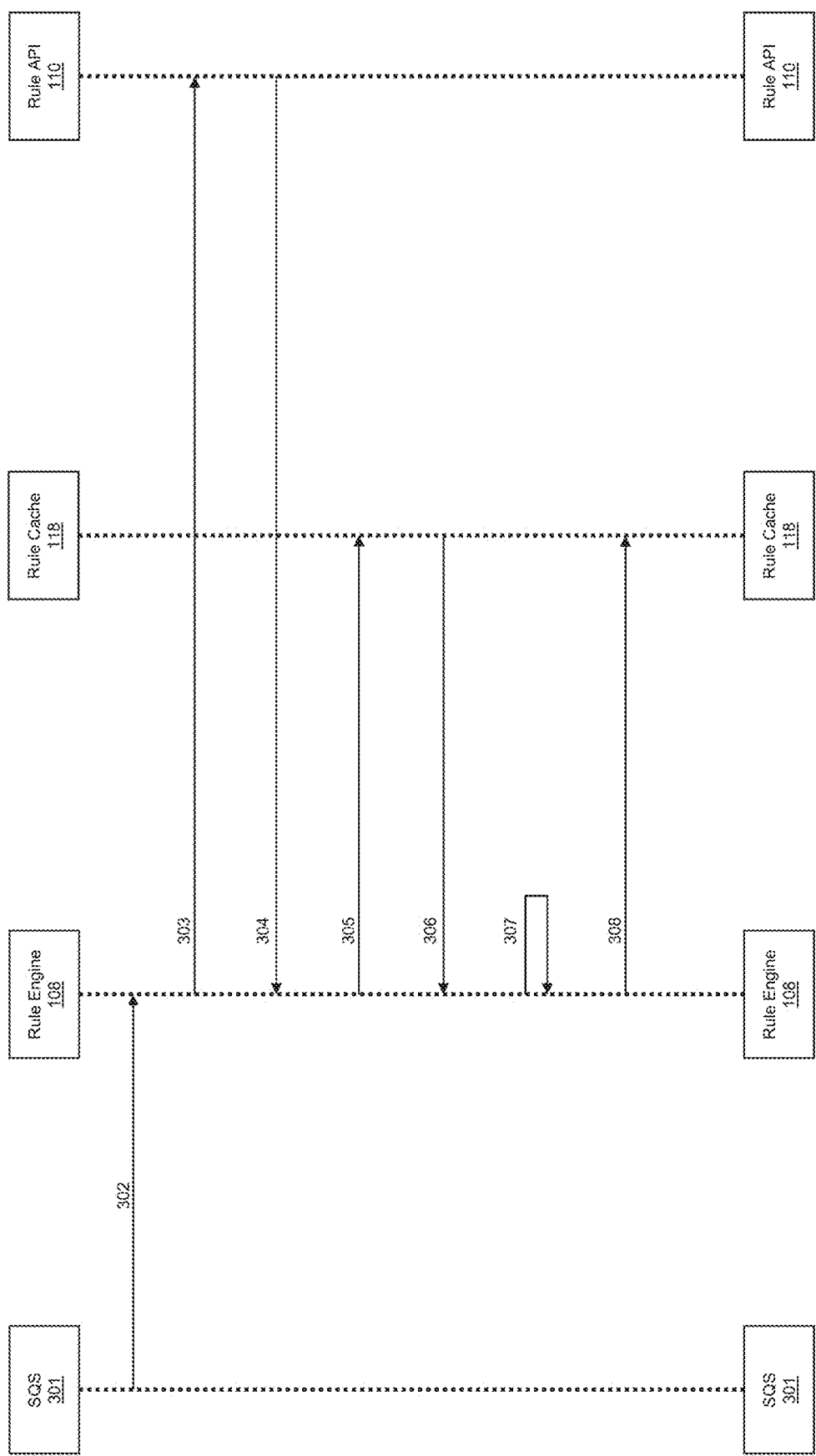
FIG. 3 is a flow diagram describing the flow of information within the system of FIG. 1, according to some embodiments of the present disclosure.

FIG. 3 is a flow diagram describing a possible flow of information within the system of FIG. 1, according to some embodiments of the present disclosure. At flow 302, rule engine 108 (such as the one described in FIGS. 1 and 2) may receive a steady or continuous stream of content (e.g. social media content or other third-party content as previously discussed) from SQS 301. SQS 301 may include a queueing service, which may be used to decouple heavyweight processing. In some embodiments, rule engine 108 may not receive a piece of content until the previous one has completed processing (e.g. the rest of the flow of FIG. 3 is completed). In other words, SQS 301 may store messages/posts/pieces of content until rule engine 108 is ready to receive the next one. Flows 303-308 may be completed for each successive piece of content received by rule engine 108. At flow 303, rule engine 108 sends a request to fetch a list of rule IDs. The list of rule IDs may correspond to the list of rules a user associated with an entity or authorized to access a system on behalf of an entity wishes to be used to analyze incoming content and may have been configured and/or selected in the rule API 110 by a user. For example, an entity may wish to detect all social media posts (perhaps within a certain distance or by mention of a specific word such as a company name or school name) that contain a weapon in an image. The entity would, via UI tools 120 on user device 104, make pre-defined selections within rule API 110 that indicate which rules should be executed on each piece of content. In some embodiments, this may help reduce computation, allowing a selective filtering of which rules need to be executed on each piece of content. The list of rule IDs may also be based on the source of the content. In some embodiments, the list of rule IDS may be stored on the cloud or may be stored within rule cache 118. For example, a user may initiate a setting where all posts from Twitter are analyzed via rules A, B, and C, while all posts from LinkedIn are analyzed via rules D and E. Additional details and examples of user selections and tailoring of rules and networks are discussed in relation to FIGS. 9-12.

At block 304, rule engine 108 receives the list of rule IDs from rule API 110. At flow 305, rule engine 108 sends a request to rule cache 118. Rule engine 108 uses the rule IDs to fetch the script associated with each rule within the rule cache. Rule engine 108 may receive the scripts as JSON objects at flow 306. At flow 307, rule engine 108 (in particular, rule execution module 112) may execute each received script on the piece of content. A script may be code or a code script that is executable by one or more processors. In some embodiments, the script code may be executable by rule execution module 112. The code may include, but is not limited to, scripting languages such as JavaScript or Python. In some embodiments, the code may be a customized implementation of JavaScript and may include added libraries and additional functionalities. At flow 308, rule engine 108 may store metrics and statistics in rule cache 118.

Figure 4:
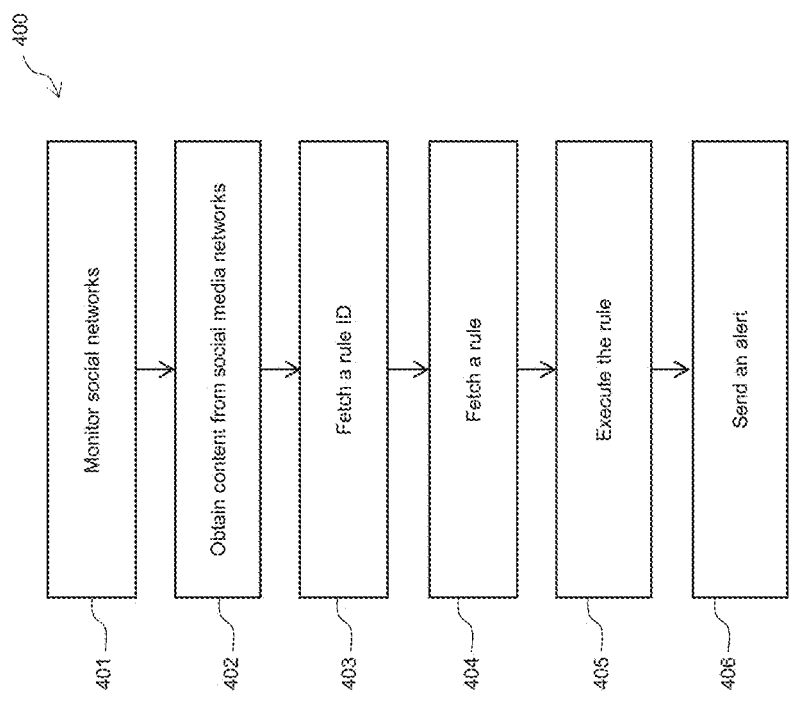
FIG. 4 is a flow diagram showing processing that may occur within the system of FIG. 1, according to some embodiments of the present disclosure.

FIG. 4 is a flow diagram showing process 400 that may occur within the system of FIG. 1, according to some embodiments of the present disclosure. At blocks 401 and 402, upstream data collectors may monitor social networks, and/or third-party platforms, such as third-party data source 102. In some embodiments, monitoring a third-party data source may include using an ingest and queueing service to ingest some or all posts and content from certain (or all) third-party data sources. The queueing service may steadily and continuously supply rule engine 108 with content. The queueing may serve to provide time for each post or piece of content to be properly analyzed by rule engine 108. In some embodiments, rule engine 108 may not receive a piece of content until the previous piece of content has been fully analyzed.

In some embodiments, each post or piece of content may include four variables when sent to the rule engine 108. The post may include information on its source (e.g. the network), the environment from which it was received (the environment may contain details related to the protected entity), parameters, and enrichment information. The content object (information related to the content) may include information on the post type (e.g. post, page, account, etc.), the text of the post, the URL, raw data, a username related to the post, and biographical information from relevant users/accounts related to the post. In some embodiments, raw data may include content that is normalized such that the data can be agnostic of its data source. The environment object (environment information) may include information about the entity for whom the content has been found and a relation object describing the content's relation to the protected entity. The parameter object may be described in relation to FIGS. 7-11. Enrichment information may include information obtained from an enrichment engine, such as the one described in application Ser. No. 16/670,081 "Methods and Systems for Enriching Data", which is herein incorporated by reference in its entirety.

Blocks 403-406 may be performed for each piece of content obtained by rule engine 108. At block 403, rule engine 108 may fetch a rule ID from rule API 110 on user device 104. In some embodiments, fetching the rule ID may be based on the piece of content (e.g. the network from which the piece of content was obtained from). For example, some rules stored within rule cache 118 may be rules based on detecting occurrences such as fraudulent job postings. Such a rule may only be executed on certain networks (e.g. Glassdoor) and may be excluded from being executed on networks such as Instagram. In some embodiments, fetching the rule ID may be based on one or more pre-defined settings made by a user on user device 104 with UI tools 120. For example, a user may have enabled or disabled certain rules from being executed (see FIG. 9) or selected certain networks from being excluded from having rules executed on (see FIG. 11). In some embodiments, rule engine 108 may fetch multiple rule IDs for a single piece of content.

At block 404, rule engine 108 may fetch a rule from rule cache 118. In some embodiments, fetching a rule may include using the rule ID obtained at block 403 to navigate the indexed rule cache 118 and extract a script associated with the rule ID. In some embodiments, the script (rule) may be fetched as a JSON object containing the script. At block 405, rule execution module 112 may execute the script (the script associated with the rule, may herein be referred to as executing the rule) on the piece of content. In some embodiments, for example when multiple rule IDs are fetched for a single piece of content, multiple rules may be executed on the same single piece of content. At block 406, rule engine 108 may send an alert to a user device 104. In some embodiments, the alert may be sent in the form of an email, text, notification, or the like. In some embodiments, the alert may include a list of potential follow-up actions. Follow-up actions can include additional notifications or automated remediation actions (such as taking down or deleting the source content). In some embodiments, a user may specify which types of alert they wish to receive. In some embodiments, the alert may be sent in response to determining that the piece of content matches the rule. For example, if a fraudulent job posting was detected on a piece of content obtained from Glassdoor, the Glassdoor post (i.e. piece of content) would be considered to "match" the rule, thus triggering an alert to be sent. "Matching" a rule may be determined based on the output of the execution of the script on the post. Additional details related to executing a rule or rules on a piece of content and sending alerts are explained in relation to FIG. 6. In some embodiments, after the completion of the processing in block 405 (e.g. every rule executions), storing in the rule cache (or updating the currently stored data to reflect) a total number of executions of the script, a total number of execution errors for the script, and a total number of alerts generated for the script. The rule cache 118 may store these metrics associated with each stored rule, indexed by rule ID. The rule cache 118 may also store time data associated with each metric. In some embodiments, in response to receiving an error while executing a script, the errors may be stored in a sorted set (e.g. a z-set in Redis) within the rule cache. In some embodiments, the sorted set may be kept at ten items; when a new error is recorded, the sorted set may be trimmed to remain at ten items (e.g. the ten most recent errors).

In some embodiments, when an alert is triggered, alert metadata may be stored within the rule cache 118, at a user device, or in a separate database/API along with the alert representation. Alert metadata may indicate why a rule was deemed to be broken and may generally provide information which allows the platform to properly display the alert to a user. For example, alert metadata may include a list of formatted matching terms or phrases, the raw data extracted from the piece of content, the content type (e.g. page, post, account, photo, etc.), a bounding box for detected objects, and the content URL where the content originated from.

Figure 5:
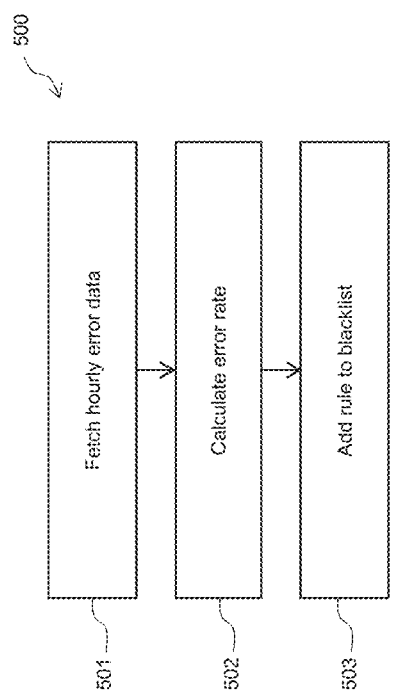
FIG. 5 is a flow diagram showing processing that may occur within the system of FIG. 1, according to some embodiments of the present disclosure.

FIG. 5 is a flow diagram showing process 500 that may occur within the system of FIG. 1, according to some embodiments of the present disclosure. In some embodiments, process 500 may be a process used to blacklist a rule (blacklisting herein may refer to disallowing a rule from being executed). In some embodiments, process 500 may be performed prior to the execution of any rule but after the rule ID has been fetched. At block 501, execution metric module 114 may fetch hourly error data associated with the fetched rule ID from rule cache 118. In some embodiments, hourly error data may include the number of script executions for the rule in the current hour, the number of script executions for the rule in the previous hour, the number of execution errors for the rule in the current hour, and the number of execution errors for the rule in the previous hour. In some embodiments, other time periods may be used and other, similar data types may be used. At block 502, execution metric module 114 may calculate an error rate based on the hourly error data. The calculation may involve at least one of or all of the aforementioned quantities. At block 503, execution metric module 114 may add the rule to a blacklist. In some embodiments, execution metric module 114 may add a rule to the blacklist if the calculated error rate is above a certain threshold. In some embodiments, blacklisting a rule may include disallowing the rule engine 108 from fetching the script associated with the rule from the rule cache 118 for a pre-defined amount of time. Process 500 may help to improve efficiency of the system and prevent an over-execution of rules, disallowing rules with high error rates from draining efficiency and wasting computation. In some embodiments, executions metrics may only be stored for twenty-four hours.

Figure 6:
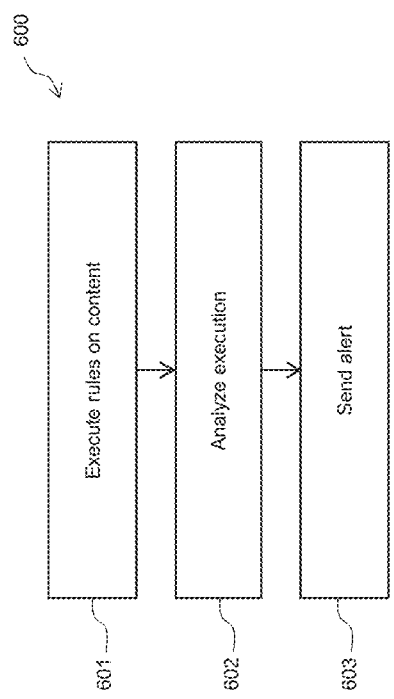
FIG. 6 is a flow diagram showing processing that may occur within the system of FIG. 1, according to some embodiments of the present disclosure.

FIG. 6 is a flow diagram showing process 600 that may occur within the system of FIG. 1, according to some embodiments of the present disclosure. In some embodiments, process 600 may be performed within process 500 and maybe used to determine when an alert should be sent in response to executing multiple rules on a piece of content. At block 601, rule execution module 112 may execute multiple rules on a piece of content. At block 602, rule execution module 112 may analyze the execution results of each rule and determine whether an alert is triggered. For example, a user may have a setting enabled where rules A, B, and C are executed on certain posts. Each rule being matched individually may not trigger an alert. However, a combination of broken rules may trigger an alert. A user may enable a predefined setting via UI tools 120 on a user device that correspond to alerts being generated. A user may define custom rule-matching permutations such as the following: if at least one of A, B, or C is broken, an alert generated; if at least two of A, B, or C are broken, an alert is generated; is A and B are broken and C is not broken, an alert is generated. These examples are not limiting; a user may implement their own logic as to what constitutes an alert based on matching of a group of individual rules (e.g. a rule group, as discussed in FIG. 9). Rule execution module 112 may be configured to analyze this logic as defined by a user and generate alerts accordingly. In some embodiments, rule execution module 112 may be configured to perform statistical analyses or algorithms in order to determine whether an alert is warranted. For example, when a larger number of rules are executed on a post (e.g. fifty or more rules) it can be tedious, cumbersome, and near impossible for a user to pre-define groupings. In some embodiments, rule execution module 112 may utilize various analyses such as a Bayes network, Monte Carlo method, or a custom grouping made by a user to analyze the results of a group of rules and decide whether an alert should be generated. At block 603, rule execution module 112 may send an alert to a device associated with the entity of the user. In some embodiments, a user may enable a custom setting via UI tools 120 (and through rule API 110) that causes a single alert to be generated for a single piece of content, regardless of the number of rules that were determined to be broken. In some embodiments, this may be referred to as an aggregated alert. In some embodiments, a user may enable a setting that, if a rule is "broken" above a certain frequency (e.g. at least five times in an hour), then an alert is generated. In some embodiments, rule execution module 112 may be configured to generate, in response to a selected setting by a user, a time-aggregated alert for a pre-defined interval of time. For example, a user may opt to have an alert sent once every twenty-four hours, and the alert may include every rule that was broken within that time interval. In some embodiments, this may be for a specific network.

Figure 7:
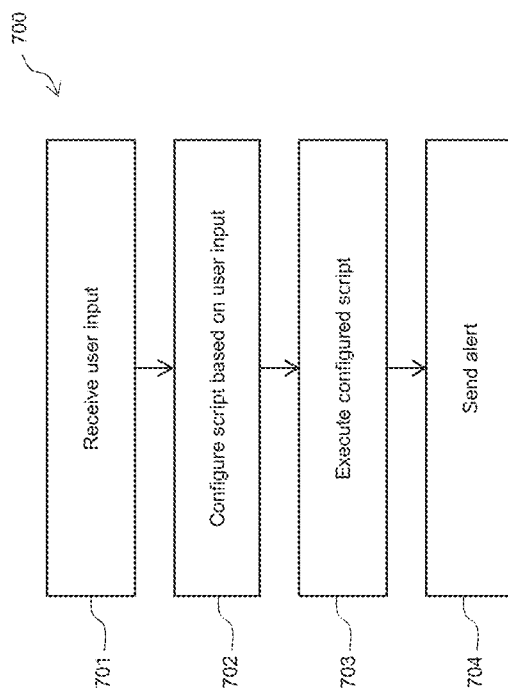
FIG. 7 is a flow diagram showing processing that may occur within the system of FIG. 1, according to some embodiments of the present disclosure.
Figure 10:
FIG. 10 is an example user interface, according to some embodiments of the present disclosure.
Figure 11:
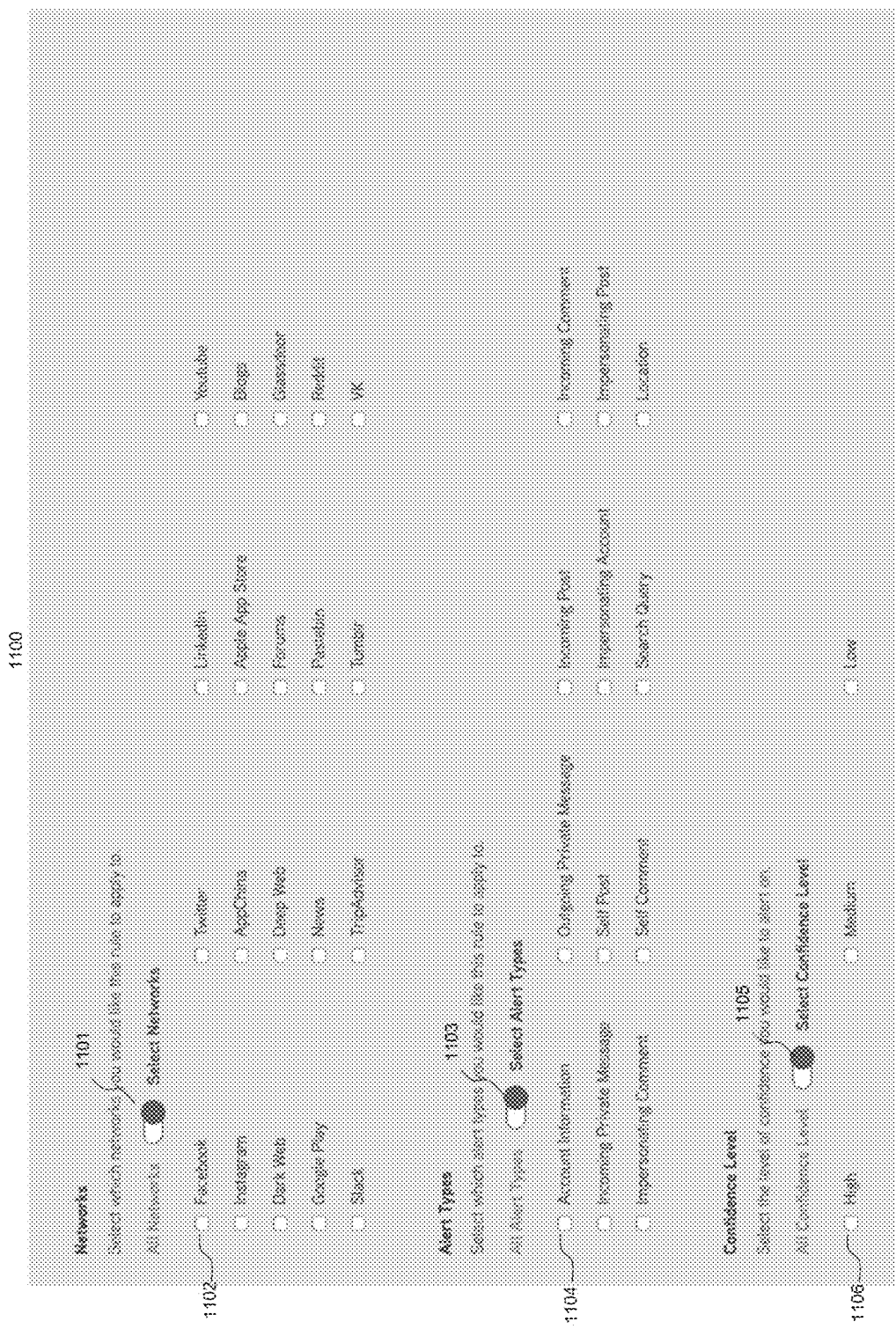
FIG. 11 is an example user interface, according to some embodiments of the present disclosure.

FIG. 7 is a flow diagram showing process 700 that may occur within the system of FIG. 1, according to some embodiments of the present disclosure. In some embodiments, process 700 may be a process for parameterizing a rule according to user input. In some embodiments, process 700 may be performed on a plurality of users that may be associated with separate entities. The parameterization functionality may allow a variety of different entities (that do not communicate with each other) to customize pre-defined and pre-supplied rules according to their own interests. At block 701, parameterization module 116 may receive a user input that was made via UI tools 120 from a user device 104. The input may be received from rule API 110 in order to be communicable with parameterization module 116. The user input, after being received, may only be associated with the entity from which it was received (e.g. a company or organization). The user input may be usable for all protected entities associated with the entity. Examples of user input that may be received (and the interface in which it may be entered by the user) are shown in FIGS. 10-11. In some embodiments, the user input may include at least one of a list of words to include in term-searching, a list of words to exclude from term-searching, or a numerical or pre-defined threshold for tuning a confidence level that triggers an alert to be generated. At block 702, parameterization module 116 may configure or change the behavior of the script (which is stored in rule cache 118) based on the user input. In some embodiments, this creates a new rule, a parameterized rule. This may include a new rule ID and create a new entry within rule cache 118. In some embodiments, the configured script or parameterized rule may only be usable by the entity that created it. At block 703, rule execution module 112 may execute the configured script (parameterized rule) as it would execute a base rule. At block 704, an alert may be generated based on whether the execution entails the sending of an alert, similar to or the same as described in relation to FIGS. 4 and 6.

Figure 8:
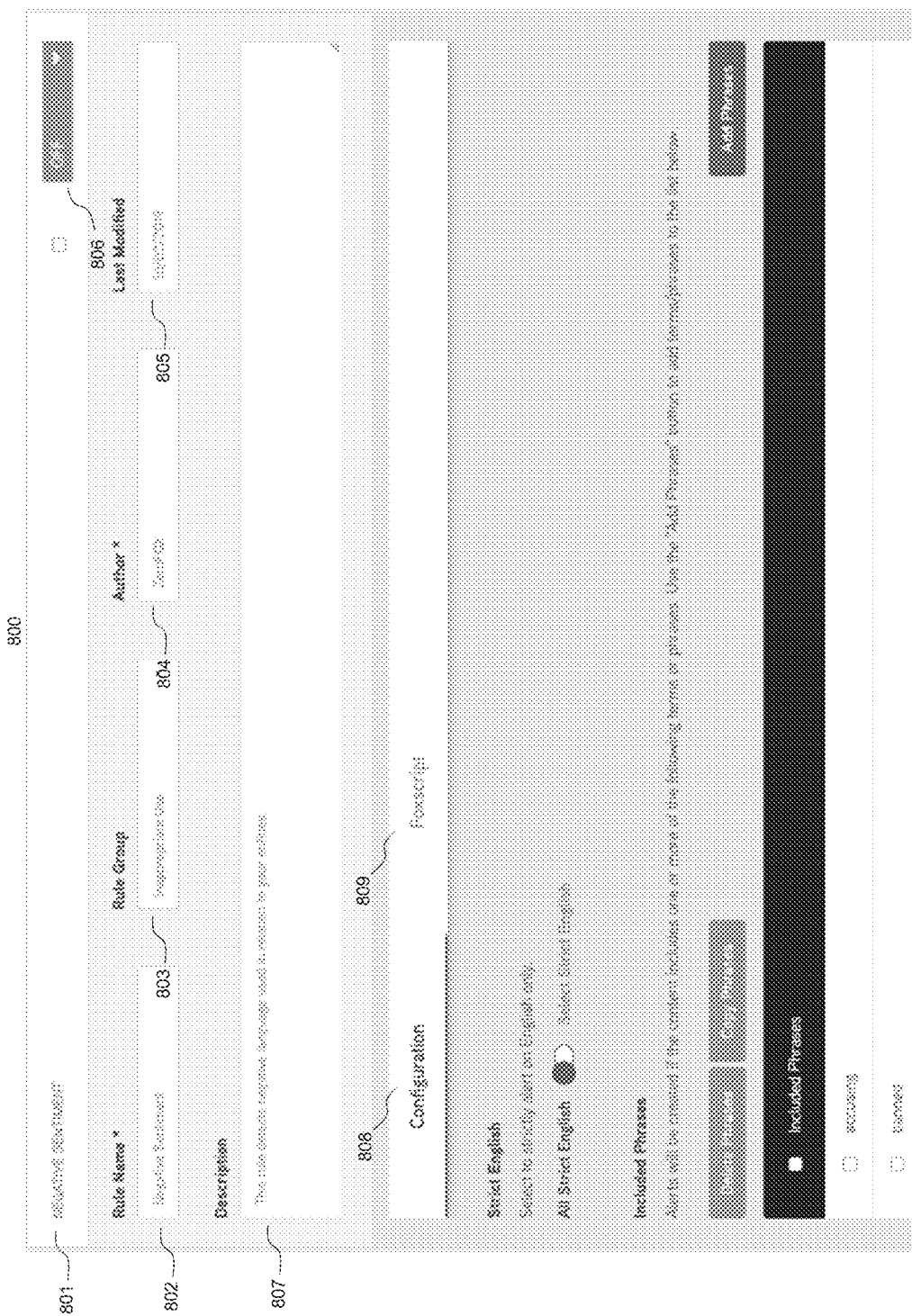
FIG. 8 is an example user interface, according to some embodiments of the present disclosure.

FIG. 8 is an example user interface 800, according to some embodiments of the present disclosure. In some embodiments, user interface 800 may appear on a user device 104 and be interacted with by a user via UI tools 120. User interface 800 may allow a user to customize a rule that is stored in the API and executed by the rule engine User interface 800 may display a title (title 801) indicating to a user which rule is being customized; in this case, a negative sentiment rule is being customized. The rule may be a default rule included in the rule cache for all entities to utilize. However, a user may edit the name using fillable field 802 to create a custom name for use within the user's associated entity. A user may also assign the rule to a "rule group" using fillable field 803. A rule group may be a way for users to edit, customize, or utilize multiple rules at the same time and separate them according to some predefined rationale. For example, a user may assign all rules related to object detection to a group titled "Object Detection." In some embodiments, a user may edit the author of the rule (in the case where it is a parameterized or custom rule) using fillable field 804. A field 805 may indicate the date the rule was last modified. In some embodiments, selectable toggle 806 may allow a user to turn a rule on or off, "on" meaning the rule is currently being executed on ingested content and "off" meaning the rule is currently prevented from being executed on ingested content. In some embodiments, a user may be able to write a description of a rule in description box 807. User interface 800 may include a button 808 that, when selected by a user, allows the user to configure or parameterize the rule. Details of this will be further provided in relation to FIGS. 10-11. User interface 800 may also include a button 809 to edit Foxscript; a functionality for a user to write their own scripts and create their own rules.

Figure 9:
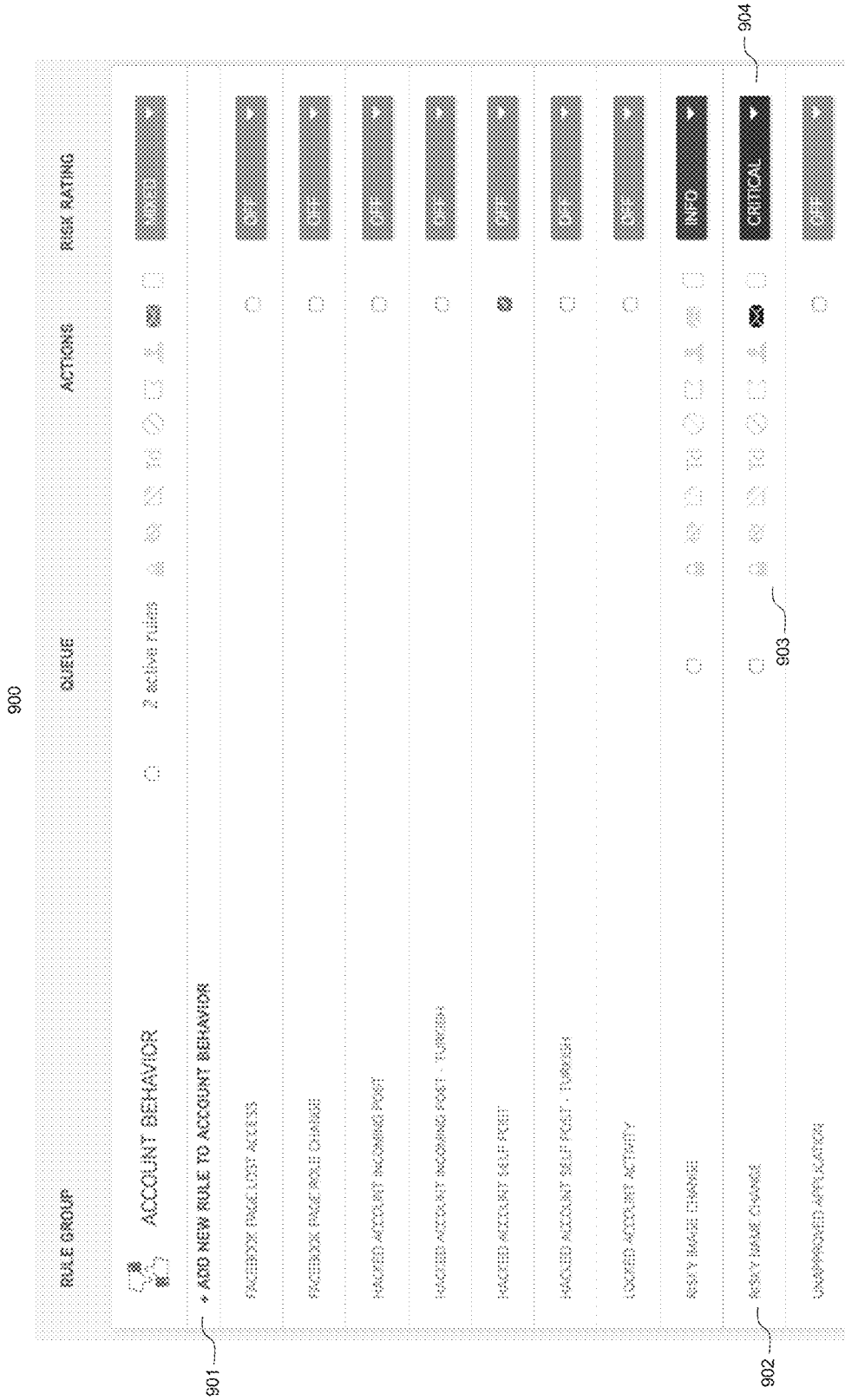
FIG. 9 is an example user interface, according to some embodiments of the present disclosure.

FIG. 9 is an example user interface 900, according to some embodiments of the present disclosure. User interface 900 may allow a user to view and edit a list of rules assigned to a rule group. In this case, the rule group is titled "Account Behavior." Button 901 may, when clicked by a user, allow the user to add a new rule to the rule group. Each rule entry within the rule group includes a rule name 902, a list of selected methods for alert sending 903, and a toggle 904. Toggle 904 may allow a user to set a risk rating for each rule. For example, risky image change is assigned a risk rating of "info;" this may mean that when a piece of content has this rule executed on it and the rule is "broken", it may correspond to a low level of risk but is still worthy of an alert or notification. Risky name change has been assigned a risk rating of "critical" which may correspond to a high level of severity. Note, toggle 904 may also indicate that a rule is "off."

FIG. 10 depicts an exemplary user interface 1000, according to some embodiments of the present disclosure. User interface 1000 may allow a user to parameterize or configure a rule (create a "parameterized rule"). Button 1001 may, when clicked by a user, allow the user to add a list of phrases to an "included phrases" list. In some embodiments, an "included phrase" list may include phrases that a user wishes to search for on behalf of an entity. If a piece of content includes one or more of the terms of phrases in the list, which may be detected during execution of a rule on the piece of content, an alert may be generated and sent to a user device. Button 1002 may, when pressed, allow a user to copy a selected number of phrases from the list. Button 1003 may, when pressed, allow a user to delete phrases from the list. Example terms in the list include terms 1004 and 1005, "accusing" and "banned." A user may also create an "excluded phrases" list on user interface 1000. If a term is on this list, no alert may be generated if any of the terms are found in a piece of content when the rule is executed Similar buttons to above (buttons 1006-1008) may be used to add, copy, and/or delete phrases from the list. In the context of the present disclosure, after a user creates lists such as these (which may be done with UI tools 120), rule API 110 may communicate with the rule engine 108 to configure the script of the associated rules to incorporate the aforementioned lists. This may be performed without a user changing code themselves or having to know how to code themselves. The configured rule parameters may then be stored in the rule cache 118 for later use, but only by users authorized on behalf of an entity.

FIG. 11 depicts an exemplary user interface 1100, according to some embodiments of the present disclosure. In some embodiments, user interface 1100 may be another way for a user to parameterize a rule. Parameterizing a rule via user interface 1100 is not a substitute or replacement or mutually exclusive from the interface described in FIG. 10. In some embodiments, each one may be used together. User interface 1100 may include a network toggle 1101 that allows a user to switch between executing a rule on content from all networks or from select networks. If the toggle is set to "select networks", a user may select networks using selectable boxes from list 1102. For example, assuming user interface 1100 has been selected in relation to Rule A, if a user selects "TripAdvisor", "Tumblr", and "Glassdoor", Rule A will only be executed on ingested content from those networks. Content ingested from networks such as Facebook and Instagram will not have Rule A executed on it.

User interface 1100 may also include an alert type toggle 1103 that allows a user to switch between having a rule trigger all alert types or select alert types. If the toggle is set to "select alert types", a user may select alert types using selectable boxes from list 1104. For example, assuming user interface 1100 is being used to parameterize Rule B, if a user selects "account information" and "outgoing private message", the entity to which the user belongs will only receive alerts for rules broken by posts or content that are related to "account information" and "outgoing private messages." User interface may also include a confidence toggle 1105 that allows a user to switch between all confidence levels or select confidence levels. If the toggle is set to "select confidence level", a user may select different confidence levels 1106 (e.g. high, medium, and/or low). For example, assuming user interface 1100 is being used to parameterize Rule C, if a user selects a "high" confidence level, the entity to which the user belongs will only receive alerts on rules that are broken with a "high" confidence level. In some embodiments, the levels of confidence may correspond to numerical percentage results that are obtained when a rule is executed on content. For example, an object detection rule may be executed on a social media post and be 70% confident that it contains a weapon. This may be considered "high confidence", while a percentage level of 50% may indicate "medium confidence" and a percentage level of 15% may indicate "low confidence."

Figure 12:
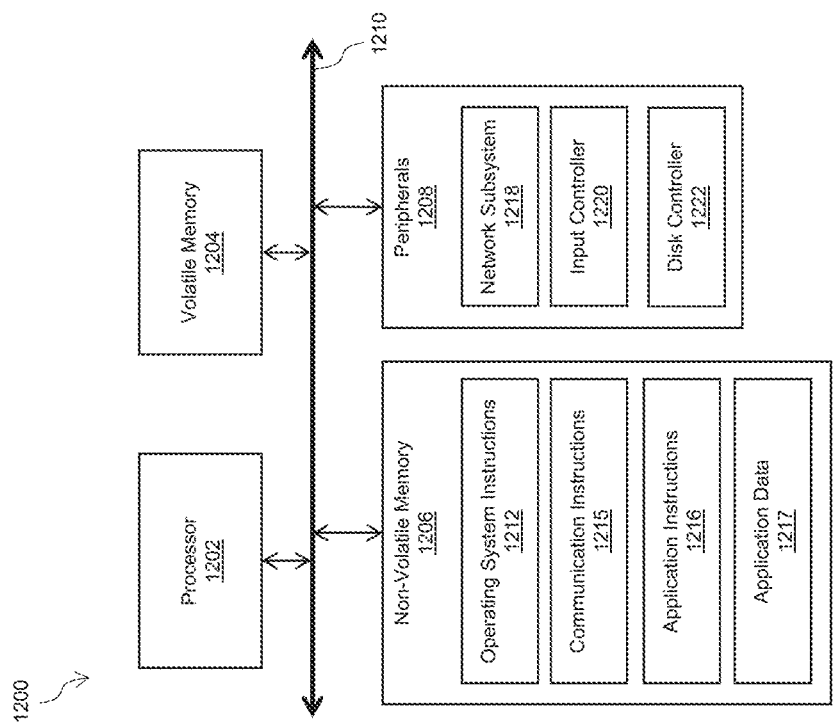
FIG. 12 is a diagram of an illustrative server device that can be used within the system of FIG. 1, according to some embodiments of the present disclosure.

FIG. 12 is a diagram of an illustrative server device that can be used within the system of FIG. 1, according to some embodiments of the present disclosure. Server device 1200 may implement various features and processes as described herein. Server device 1200 may be implemented on any electronic device that runs software applications derived from compiled instructions, including without limitation personal computers, servers, smart phones, media players, electronic tablets, game consoles, email devices, etc. In some implementations, server device 1200 may include one or more processors 1202, volatile memory 1204, non-volatile memory 1206, and one or more peripherals 1208. These components may be interconnected by one or more computer buses 1210.

Processor(s) 1202 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 1210 may be any known internal or external bus technology, including but not limited to ISA, EISA, PCI, PCI Express, NuBus, USB, Serial ATA, or FireWire. Volatile memory 1204 may include, for example, SDRAM. Processor 1202 may receive instructions and data from a read-only memory or a random access memory or both. The essential elements of a computer may include a processor for executing instructions and one or more memories for storing instructions and data.

Non-volatile memory 1206 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1206 may store various computer instructions including operating system instructions 1212, communication instructions 1215, application instructions 1216, and application data 1217. Operating system instructions 1212 may include instructions for implementing an operating system (e.g., Mac OS®, Windows®, or Linux). The operating system may be multi-user, multiprocessing, multitasking, multithreading, real-time, and the like. Communication instructions 1215 may include network communications instructions, for example, software for implementing communication protocols, such as TCP/IP, HTTP, Ethernet, telephony, etc. Application instructions 1216 can include instructions for detecting online threats using rules. For example, application instructions 1216 may include instructions for components 112-116 described above in conjunction with FIG. 1.

Peripherals 1208 may be included within server device 1200 or operatively coupled to communicate with server device 1200. Peripherals 1208 may include, for example, network subsystem 1218, input controller 1220, and disk controller 1222. Network subsystem 1218 may include, for example, an Ethernet of WiFi adapter. Input controller 1220 may be any known input device technology, including but not limited to a keyboard (including a virtual keyboard), mouse, track ball, and touch-sensitive pad or display. Disk controller 1222 may include one or more mass storage devices for storing data files; such devices include magnetic disks, such as internal hard disks and removable disks; magneto-optical disks; and optical disks.

Methods described herein may represent processing that occurs within a system for detecting online threats with a rule-based approach. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A system for rule-based online threat detection comprising:
    a server comprising a rule cache; and
    a computer-readable medium comprising instructions stored thereon which, when executed by the server, cause the server to execute a process operable to:
    monitor a plurality of third-party data sources;
    obtain, via a queueing service, a plurality of pieces of content from the plurality of third-party data sources; and
    for each piece of content:
    fetch a rule ID from a list of rule IDs on a user device, wherein the rule ID is fetched based on the piece of content and a pre-selected setting on the user device;
    use the rule ID to fetch a rule from the rule cache, the rule comprising a script, wherein the script comprises executable code;
    execute the script on the obtained piece of content to determine if the piece of content matches the rule;
    in response to determining that the piece of content matches the rule, send an alert to the user device;
    in response to receiving an error while executing the script, store the error in a sorted set in the rule cache;
    fetch, from the rule cache, temporal error data for the rule, wherein the temporal error data comprises a number of script executions for the rule in a current time period, a number of script executions for the rule in a previous time period, a number of execution errors for the rule in the current time period, and a number of execution errors for the rule in the previous time period;

calculate an error rate for the rule based on the temporal error data; and in response to calculating an error rate above a certain pre-defined threshold, disallow the server from fetching the rule from the rule cache for a pre-defined amount of time.

2. The system of claim 1, where the server is configured to, in response to storing the error in the sorted set in the rule cache, trim the sorted set to ten most recent errors.

3. The system of claim 1, wherein the server is configured to, in response to executing the script, store a total number of executions of the script, a total number of execution errors for the script, and a total number of alerts generated for the rule in the rule cache.

4. The system of claim 1, wherein the server comprises a plurality of server instances, each server instance being configured to run a number of executions and comprising a local rule cache.

5. The system of claim 1, wherein monitoring the plurality of third-party data sources comprises:

receiving, from the user device, a selection of third-party data sources, wherein the selection was performed via a user input on the user device; and obtaining, via the queueing service, the plurality of pieces of content from the selection of third-party data sources.

6. The system of claim 1, wherein the server is configured to:

receive, from the user device, a user input from a user associated with a protected entity;

configure the script based on the user input to create a parameterized rule;

prevent the parameterized rule from being used by entities other than the protected entity;

execute the configured script on a second obtained piece of content to determine if the second obtained piece of content matches the parameterized rule; and in response to determining that the second obtained piece of content matches the parameterized rule, send a second alert to the user device.

7. The system of claim 6, wherein the user input comprises at least one of:

a list of words to include in term-searching the second obtained piece of content;

a list of words to exclude from term-searching the second obtained piece of content; or a numerical threshold for tuning a confidence level of the rule that triggers the alert to be generated.

8. A method for rule-based online threat detection comprising:

monitoring, by a server, a plurality of third-party data sources;

obtaining, by the server and via a queueing service, a plurality of pieces of content from the plurality of third-party data sources; and for each piece of content:

fetching, by the server, a rule ID from a list of rule IDs on a user device, wherein the rule ID is fetched based on a third-party data source of the piece of content and a pre-selected setting on the user device;

using, by the server, the rule ID to fetch a rule from a rule cache, the rule comprising a script, wherein the script comprises executable code;

executing, by the server, the script on the obtained piece of content to determine if the piece of content matches the rule; and in response to determining that the piece of content matches the rule, sending an alert to the user device;

in response to receiving an error while executing the script, store the error in a sorted set in the rule cache;

fetch, from the rule cache, temporal error data for the rule, wherein the temporal error data comprises a number of script executions for the rule in a current time period, a number of script executions for the rule in a previous time period, a number of execution errors for the rule in the current time period, and a number of execution errors for the rule in the previous time period;

calculate an error rate for the rule based on the temporal error data; and in response to calculating an error rate above a certain pre-defined threshold, disallow the server from fetching the rule from the rule cache for a pre-defined amount of time.

9. The method of claim 8 comprising, in response to storing the error in the sorted set in the rule cache, trimming the sorted set to ten most recent errors.

10. The method of claim 8 comprising, in response to executing the script, storing, by the server, a total number of executions of the script, a total number of execution errors for the script, and a total number of alerts generated for the rule in the rule cache.

11. The method of claim 8, wherein sending the alert comprises:

executing, by the server, a plurality of rules on the piece of content to determine if the content matches each rule individually;

analyzing the execution of the plurality of rules, wherein analyzing comprises using at least one of a Bayes network, a Monte Carlo method, or a custom grouping provided by the user device; and in response to analyzing the execution of the plurality of rules, sending the alert to the user device.

12. The method of claim 8, wherein monitoring the plurality of third-party data sources comprises:

receiving, by the server and from the user device, a selection of third-party data sources, wherein the selection was performed via a user input on the user device; and obtaining, by the server and via the queueing service, the plurality of pieces of content from the selection of third-party data sources.

13. The method of claim 8 comprising:

receiving, by the server and from the user device, a user input from a user associated with a protected entity;

configuring, by the server, the script based on the user input to create a parameterized rule;

preventing, by the server, the parameterized rule from being used by entities other than the protected entity;

executing, by the server, the configured script on a second obtained piece of content to determine if the second obtained piece of content matches the parameterized rule; and in response to determining that the second obtained piece of content matches the parameterized rule, sending a second alert to the user device.

14. The method of claim 13, wherein the user input comprises at least one of:

a list of words to include in term-searching the second obtained piece of content; or a list of words to exclude from term-searching the second obtained piece of content.

15. The method of claim 13, wherein the user input comprises a numerical threshold for tuning a confidence level of the rule that triggers the alert to be generated.

16. A method for rule-based online threat detection comprising:
   monitoring, by at least one of a plurality of server instances, a plurality of third-party data sources;
   obtaining, by the at least one of a plurality of server instances and via a queueing service, a plurality of pieces of content from the plurality of third-party data sources; and
   for each piece of content:
      fetching, by the at least one of a plurality of server instances, a rule ID from a list of rule IDs on a user device, wherein the rule ID is fetched based on the piece of content and a pre-selected setting on the user device;
      using, by the at least one of a plurality of server instances, the rule ID to fetch a rule from a rule cache, the rule comprising a script, wherein the script comprises executable code, wherein the rule cache is a Redis cluster;
      executing, by the at least one of a plurality of server instances, the script on the obtained piece of content to determine if the obtained piece of content matches the rule; and
      in response to receiving an error while executing the script, storing the error in the rule cache, wherein all errors associated with a same rule are stored in a single shard of the Redis cluster;
   fetching, from the rule cache, temporal error data for the rule, wherein the temporal error data comprises a number of script executions for the rule in a current time period, a number of script executions for the rule in a previous time period, a number of execution errors for the rule in the current time period, and a number of execution errors for the rule in the previous time period;
   calculating an error rate for the rule based on the temporal error data; and
   in response to calculating an error rate above a certain pre-defined threshold, disallowing the server from fetching the rule from the rule cache for a pre-defined amount of time.

* * * * *